US006704639B2

(12) United States Patent
Amano

(10) Patent No.: US 6,704,639 B2
(45) Date of Patent: Mar. 9, 2004

(54) METHOD OF CALCULATING ENGINE TORQUE

(75) Inventor: Naoki Amano, Nishin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/408,249

(22) Filed: Apr. 8, 2003

(65) Prior Publication Data

US 2003/0204302 A1 Oct. 30, 2003

(30) Foreign Application Priority Data

Apr. 26, 2002 (JP) ....................................... 2002-126959

(51) Int. Cl.[7] ................................................ G06F 19/00
(52) U.S. Cl. ........................ 701/102; 123/447; 123/507
(58) Field of Search ................................ 701/102, 103, 701/104, 111; 123/447, 507, 508, 509, 436, 406.23

(56) References Cited

U.S. PATENT DOCUMENTS

| | | | | |
|---|---|---|---|---|
| 4,351,419 A | * | 9/1982 | Garrett et al. | 188/71.9 |
| 4,394,890 A | * | 7/1983 | Kleinhagen, Jr. | 188/71.9 |
| 4,433,765 A | * | 2/1984 | Rude et al. | 192/41 S |
| 4,527,683 A | * | 7/1985 | Mathews | 192/111 A |
| 5,265,575 A | | 11/1993 | Norota | |
| 5,351,776 A | | 10/1994 | Keller et al. | |
| 5,558,178 A | | 9/1996 | Hess et al. | |
| 5,577,474 A | | 11/1996 | Livshiz et al. | |
| 5,657,230 A | | 8/1997 | Hess et al. | |
| 5,868,474 A | | 2/1999 | Abe et al. | |
| 5,941,925 A | | 8/1999 | Hess et al. | |
| 6,237,329 B1 | * | 5/2001 | Mizuno | 60/285 |

FOREIGN PATENT DOCUMENTS

| | | |
|---|---|---|
| JP | A 2-291449 | 12/1990 |
| JP | A 2-291450 | 12/1990 |
| JP | A 2-291451 | 12/1990 |
| JP | A 2-291452 | 12/1990 |
| JP | A 2-291453 | 12/1990 |
| JP | A 2-291454 | 12/1990 |
| JP | A 5-85228 | 4/1993 |
| JP | A 6-219191 | 8/1994 |
| JP | A 2000-127807 | 5/2000 |
| JP | A 2002-180870 | 6/2002 |

* cited by examiner

*Primary Examiner*—John Kwon
(74) *Attorney, Agent, or Firm*—Oliff & Berridge, PLC

(57) ABSTRACT

In an engine torque calculation method, basic engine torque TQb is calculated based on an engine rotational speed Ne and a fuel injection amount Q, and the basic engine torque TQb is corrected using a predetermined parameter (e.g., an intake air amount Q) which has an influence on engine torque, whereby engine torque TQact is calculated. A torque sensitivity coefficient K1 corresponding to an amount of change in the engine torque TQact when the parameter changes by a unit amount is calculated based on the engine rotational speed Ne and the fuel injection amount Q, and the engine torque TQb is corrected using the torque sensitivity coefficient K1.

20 Claims, 10 Drawing Sheets

METHOD OF CALCULATING ENGINE TORQUE

INCORPORATION BY REFERENCE

The disclosure of Japanese Patent Application No. 2002-126959 filed on Apr. 26, 2002, including the specification, drawings and abstract is incorporated herein by reference in its entirety.

BACKGROUND OF THE INVENTION

1. Field of the Invention

The invention relates to a method of calculating engine torque by calculating basic engine torque based on an engine rotational speed and a fuel injection amount, and correcting the basic engine torque.

2. Description of the Related Art

Known technologies that involve control of torque in vehicles may include, for example, transmission control, ABS (Antilock Brake System) control, and traction control. In these technologies, with regard to an engine, actual torque of the engine (engine torque) is controlled to be equal to target torque. Also, with regard to the aforementioned transmission control and the like, a controlled variable of an actuator is calculated according to the actual torque of the engine, and the driving of the actuator is controlled according to the controlled variable. For example, in the case of the transmission control, a controlled variable of a solenoid valve for shifting is calculated according to the actual torque of the engine, and the solenoid valve is driven according to the controlled variable. By driving the solenoid valve in this manner, a hydraulic circuit is switched and a certain gear position (a first speed, a second speed, a third speed, or the like) is determined, so that shifting is performed. Also, in the case of the ABS control, a controlled variable of a brake hydraulic pressure of a wheel cylinder is calculated according to the actual torque of the engine, and the actuator is driven according to the controlled variable. By driving the actuator in this manner, the brake hydraulic pressure is controlled, and a slip ratio between the wheel and a road surface is maintained at a desirable value. Accordingly, in order to perform the transmission control and the like, it is required to calculate the actual torque of the engine accurately in the torque control of the engine.

In this regard, for example, in Japanese Patent Laid-Open Publication 200-0127807, the engine torque is calculated as follows. First, basic engine torque is determined based on an engine rotational speed and a fuel injection amount. In addition, a correction coefficient is determined based on a parameter, such as an intake air amount and an intake air pressure, which is considered to have an influence on the engine torque. Then, the engine torque is calculated by correcting the basic engine torque using the correction coefficient.

Meanwhile, the degree of the influence of the parameter on the engine torque changes according to an operating state of the engine at this time, such as the. engine rotational speed and the fuel injection amount. In this regard, in the technology disclosed in the aforementioned patent publication, only a single correction coefficient is set for each type of a parameter, and no consideration is given to the fact that the degree of the influence as described above changes. Thus, if the degree of the influence of the parameter on the engine torque varies according to the operating state of the engine, the varying degree of the influence cannot be reflected in the calculation of the engine torque. Therefore, in the method disclosed in the aforementioned patent publication, there is a limit to improving the accuracy of calculating the engine torque.

SUMMARY OF THE INVENTION

It is an object of the invention to provide a calculation method by which engine torque can be calculated with higher accuracy than when basic engine torque is corrected simply by a certain parameter.

A first aspect of the invention relates to a method of calculating engine torque by calculating basic engine torque based on an engine rotational speed and a fuel injection amount, and correcting the basic engine torque using a predetermined parameter which has an influence on the engine torque. In this calculation method, a torque sensitivity coefficient corresponding to an amount of change in the engine torque when the parameter changes by a unit amount is calculated based on at least the engine rotational speed, and the basic engine torque is corrected using the calculated torque sensitivity coefficient.

According to the aforementioned calculation method, the basic engine torque is calculated based on the engine rotational speed and the fuel injection amount. This basic engine torque is the. torque when the engine is in a standard state. Also, the torque sensitivity coefficient associated with the predetermined parameter is calculated based on at least the engine rotational speed. The parameter has an influence on the engine torque, and the torque sensitivity coefficient corresponds to the amount of change in the engine torque when the parameter changes by a unit amount.

Then, the basic engine torque is corrected using the parameter and the torque sensitivity coefficient. As described above, the torque sensitivity coefficient is calculated based on the operating state of the engine (at least the engine rotational speed) at this time. That is, the calculated torque sensitivity coefficient corresponds to the operating state of the engine. Thus, it is possible to determine the engine torque on which the parameter has an influence whose degree corresponds to the current operating state of the engine, by correcting the basic engine torque using the parameter and the torque sensitivity coefficient.

Accordingly, even if the degree of the influence of the parameter on the engine torque changes according to the operating state of the engine such as the engine rotational speed, the engine torque that reflects the changed degree of the influence is calculated. As a result, it is possible to improve the accuracy of calculating the engine torque as compared with the case where the basic engine torque is corrected using a single correction coefficient that is set depending upon the type of the parameter.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

First Embodiment

Hereinafter, a method of calculating engine torque of a diesel engine according to a first embodiment of the invention will be described.

Figure 1:
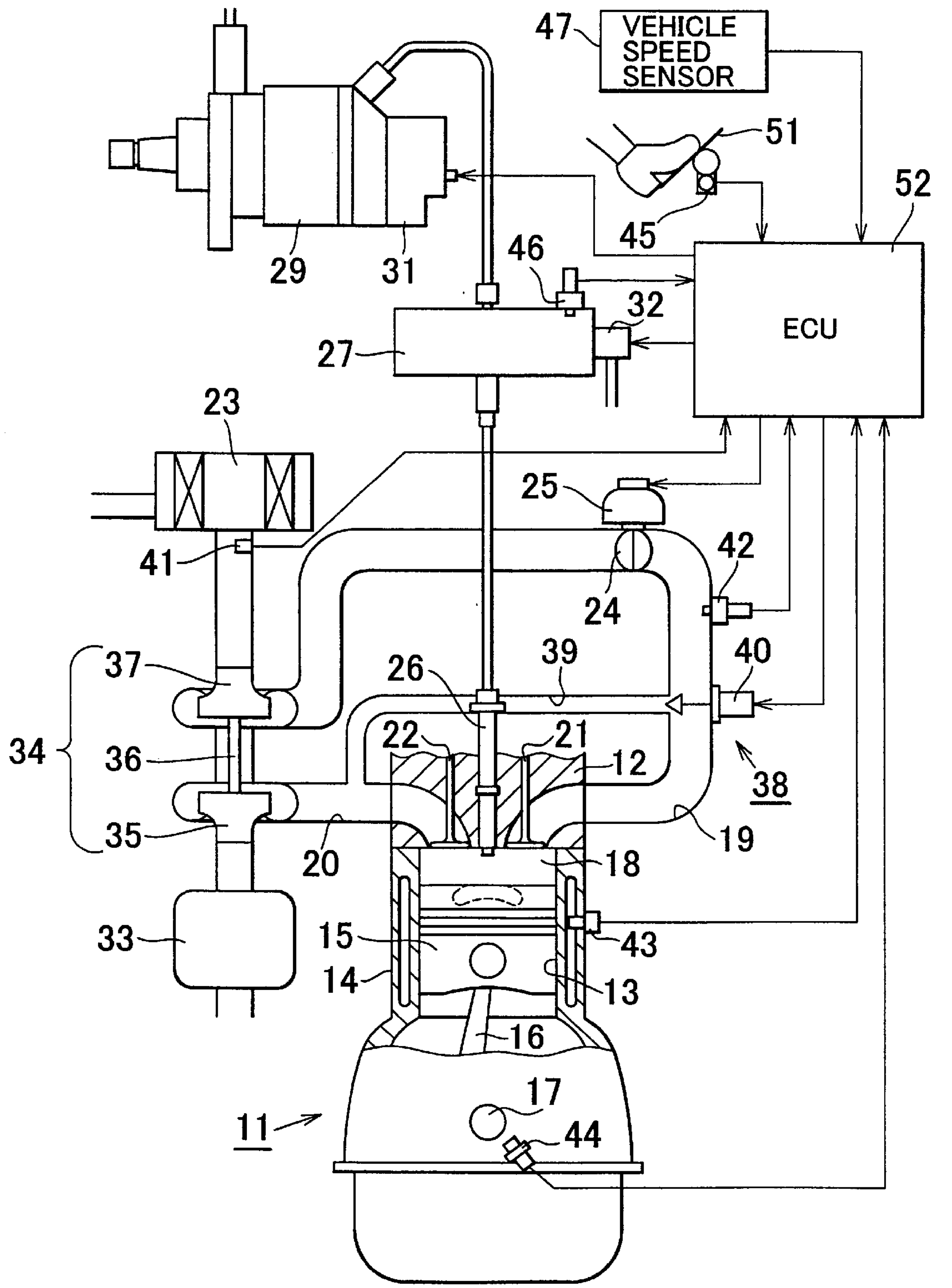
FIG. 1 is a schematic diagram schematically showing a diesel engine to which an engine torque calculation method is applied in a first embodiment of the invention.

As shown in FIG. 1, a pressure accumulating type diesel engine (hereinafter, simply referred to as an engine) 11 is mounted as a motor in a vehicle. The engine 11 includes a cylinder head 12 and a cylinder block 14 having a plurality of cylinders 13. A piston 15 is housed in each cylinder 13 so as to be capable of reciprocating motion. Each piston 15 is connected to a crank shaft 17, which is an output shaft of the engine, via a connecting rod 16. The reciprocating motion of each piston 15 is transmitted to the crank shaft 17 after being transformed to rotational motion by the connecting rod 16. The speed of the rotation of the crank shaft 17 is changed by a transmission (not shown), and the rotation whose speed has been changed is transmitted to driving wheels.

A combustion chamber 18 is provided in each cylinder 13 in the engine 11. An intake passage 19 and an exhaust passage 20 are connected to each combustion chamber 18. An intake valve 21 and an exhaust valve 22 are provided in the cylinder head 12 for each cylinder 13. The intake valve 21 and the exhaust valves 22 reciprocate in accordance with the rotation of the crank shaft 17, thereby opening and closing the intake passage 19 and exhaust passages 20.

An air cleaner 23, an intake throttle valve 24, and the like are disposed in the intake passage 19. Basically, when the piston 15 moves downward with the exhaust valve 22 closed and the intake valve 21 opened in a suction stroke of the engine 11, the air pressure in the cylinder 13 becomes lower than the outside air pressure (that is, the air pressure in the cylinder 13 becomes a negative pressure), and air outside the engine 11 passes through respective portions of the intake passage 19 in the order of arrangement and is taken into the combustion chamber 18.

The intake throttle valve 24 is rotatably supported in the intake passage 19, and is driven by an actuator 25 such as a step motor connected to the intake throttle valve 24. The amount of air flowing in the intake passage 19 (intake air amount) changes according to the opening of the intake throttle valve 24.

A fuel injector 26 which injects fuel to each combustion chamber 18 is mounted in the cylinder head 12. The fuel injector 26 includes a solenoid valve (not shown), which controls fuel injection from the fuel injector 26 to the combustion chamber 18. The fuel injector 26 is connected to a common rail 27 which is a pressure accumulating container (common pressure accumulating pipe). While the solenoid valve is opened, the fuel in the common rail 27 is injected from the fuel injector 26 to the corresponding combustion chamber 18. Relatively high pressure corresponding to the fuel injection pressure is accumulated in the common rail 27. In order to accumulate such pressure, the common rail 27 is connected to a supply pump 29 which is a fuel pump.

The supply pump 29 sucks fuel from a fuel tank (not shown), and its plunger reciprocates using a cam which rotates in synchronism with the engine 11 so as to increase the pressure of the fuel to a predetermined pressure and supply the fuel to the common rail 27. In the supply pump 29, an intake amount adjustment valve 31 is provided as a pressure control valve for controlling the pressure of the fuel discharged toward the common rail 27, and accordingly controlling the discharge amount of the fuel.

In the common rail 27, a pressure reducing valve (a relief valve) 32 which is opened when a predetermined condition is satisfied is provided. By opening this pressure reducing valve 32, the high-pressure fuel in the common rail 27 is returned to the fuel tank through a return pipe (not shown), whereby the pressure in the common rail 27 is reduced.

In operation, fuel is injected from the fuel injector 26 to be mixed with high-temperature, high-pressure intake air which is introduced into the cylinder 13 through the intake passage 19 and is compressed by the piston 15. The injected fuel ignites by itself and burns. Due to the fuel gas generated at this time, the piston 15 reciprocates, and the crank shaft 17 is rotated, whereby the driving force (output torque) of the engine 11 is generated. The fuel gas passes through a catalyst 33 provided in the exhaust passage 20, and is discharged to the outside of the engine 11.

A turbocharger 34 is provided as a supercharger in the engine 11. The turbocharger 34 includes a turbine wheel 35 which is rotated by exhaust gas flowing in the exhaust passage 20, and a compressor wheel 37 which is disposed in the intake passage 19, and is connected to the turbine wheel 35 via a rotor shaft 36. In the turbocharger 34, the exhaust gas is directed at the turbine wheel 35, whereby the turbine wheel 35 is rotated. This rotation is transmitted to the compressor wheel 37 via the rotor shaft 36. As a result, in the engine 11, air is not only fed to the combustion chamber 18 by the negative pressure which is generated in the combustion chamber 18 due to the movement of the piston 15, but also is forcibly fed to the combustion chamber 18 (that is, the air is supercharged) due to the rotation of the compressor wheel 37. In this manner, the efficiency in charging the combustion chamber 18 with air is improved.

In the engine 11, an exhaust gas recirculation device (hereinafter, simply referred to as an EGR device) 38 which recirculates part of exhaust gas flowing in the exhaust passage 20 to the intake passage 19 is provided. The EGR device 38 increases the percentage of inert gas in the air-fuel mixture so as to decrease the maximum combustion temperature by using the exhaust gas (that is, the EGR gas) recirculated and mixed into the intake air, thereby reducing generation of nitrogen oxides (NOx) which is an air contaminant.

The EGR device 38 includes an EGR passage 39 and an EGR valve 40. The EGR passage 39 connects the exhaust passage 20 and a portion of the intake passage 19 downstream of the intake throttle valve 24. The EGR valve 40 is mounted. at a certain location in the EGR passage 39, for example, at a location where the EGR passage 39 and the intake passage 19 are connected. The amount of the EGR gas flowing in the EGR passage 39 changes according to the opening of the EGR valve 40.

In order to detect the operating state of the engine 11 and the like, various sensors, such as an airflow meter 41, an intake air pressure sensor 42, a coolant temperature sensor 43, a crank position sensor 44, an accelerator. sensor 45, a fuel pressure sensor 46, and a vehicle speed sensor 47, are used. The airflow meter 41 is mounted downstream of, and in the vicinity of the air cleaner 23 in the intake passage 19 so as to detect the amount of air flowing in the intake passage 19 (an intake air amount QI). The intake air pressure sensor 42 is provided downstream of the intake throttle valve 24 in the intake passage 19 so as to detect the pressure of the intake air in the intake passage 19 (an intake air pressure PI).

The coolant temperature sensor 43 is attached to the cylinder block 14 so as to detect the temperature of coolant (a coolant temperature THW). The crank position sensor 44 is disposed in the vicinity of the crank shaft 17. The crank position sensor 44 outputs a pulse signal each time the crank shaft 17 rotates by a predetermined angle. This pulse signal is used to detect engine rotational speed Ne which is the number of rotation of the crank shaft 17 per unit time. The accelerator sensor 45 is disposed in the vicinity of an accelerator pedal 51 so as to detect the amount of depression of the accelerator pedal 51 performed by a driver (an accelerator opening ACCP). The fuel pressure sensor 46 is attached to the common rail 27 so as to detect the pressure of the fuel accumulated in the common rail 27 (a fuel pressure PF). The vehicle speed sensor 47 detects a vehicle speed SPD which is the running speed of the vehicle.

In order to control each portion of the engine 11 based on the values detected by the aforementioned various sensors 41 to 47, an electronic control unit (hereinafter referred to as ECU) 52 is provided in the vehicle. The ECU 52 includes a microcomputer as a main component. A central processing unit (CPU) performs calculation processing based on control programs, initial data, maps, and the like stored in a read only memory (ROM). On the basis of the result of the calculation, the ECU 52 performs various kinds of control. The result of the calculation performed by the CPU is temporarily stored in a random access memory (RAM).

Examples of the aforementioned various kinds of control are fuel injection control, injection pressure control, EGR control, and the like. For example, in the fuel injection control, an energization time (an injection period) is determined based on the fuel pressure PF and an injection amount command value corresponding to the operating state of the engine 11 at this time (the engine rotational speed Ne, the accelerator opening ACCP, the coolant temperature THW, and the like). Then, the fuel injector 26 is opened by supplying current to the solenoid valve over the calculated energization time, so that the fuel whose amount corresponds to the injection amount command value is injected.

Also, in the injection pressure control, a target pressure corresponding to the operating state of the engine 11 is calculated, and the fuel pressure PF is controlled so as to become substantially equal to the target pressure. There are following two modes in a method of executing this control. Switching between the modes is performed according to the operating state of the engine 11. In one of the modes, the amount of the fuel delivered (or discharged) under pressure from the supply pump 29 to the common rail 27 is adjusted by controlling the opening of the intake amount adjustment valve 31 while keeping the pressure reducing valve 32 closed. In the other mode, the amount of the fuel returned from the common rail 27 to the fuel tank is adjusted by controlling the opening of the pressure reducing valve 32 while the opening of the intake amount adjustment valve 31 is maximized, and the maximum amount of the fuel is delivered under pressure from the supply pump 29 to the common rail 27.

In order to deliver the fuel under pressure to the common rail 27, certain driving torque is required for driving the supply pump 29. This driving torque varies according to the amount of the fuel delivered under pressure from the supply pump 29. Particularly, when the injection pressure is controlled by controlling the opening of the pressure reducing valve 32, the maximum amount of the fuel is delivered under pressure from the supply pump 29 to the common rail 27, which makes the required driving torque maximum.

By controlling the intake amount adjustment valve 31 and the pressure reducing valve 32 in either one of the aforementioned modes, the fuel pressure PF becomes close to and substantially equal to the target pressure, and thus becomes optimum. Thus, the fuel pressure required for fuel injection from the fuel injector 27 is ensured.

In the EGR control, it is determined whether or not the conditions for executing the EGR control are satisfied based on the operating state of the engine 11. The EGR control execution conditions may include a condition that the coolant temperature THW is equal to or higher than a predetermined value, a condition that the engine 11 is continuously operated from the start of the engine for a predetermined time or longer, a condition that the amount of change in the accelerator opening ACCP is a positive value (that is, the accelerator pedal is depressed), and other conditions. When any of the EGR control execution conditions is not satisfied, the EGR valve 40 is maintained in a fully closed state. Meanwhile, if the execution conditions are satisfied, a target opening of the EGR valve 40 corresponding to the engine rotational speed Ne and the accelerator opening ACCP is calculated with reference to a predetermined map or the like. Then, the driving of the EGR valve 40 is controlled based on the target opening.

In addition, the ECU 52 calculates the engine torque which changes according to a change in a certain parameter, for example, the intake air amount QI. Next, a procedure for calculating the engine torque will be described according to a flowchart of FIG. 2A.

First, in step 110, the ECU 52 reads the engine rotational speed Ne detected by the crank position sensor 44, and the intake air amount QI detected by the airflow meter 41. Subsequently, in step 120, basic engine torque TQb, which is the torque while the engine 11 is in a standard state, is calculated. When performing this calculation, reference is made to, for example, a two-dimensional map which specifies a relation between the engine rotational speed Ne and the fuel injection amount Q, and the basic engine torque TQb. The engine rotational speed Ne and the fuel injection amount Q are parameters which are considered to have a relatively large influence on engine torque TQact. The map is plotted, for example, by measuring the engine torque while the engine rotational speed Ne and the fuel injection amount Q are variously changed by experiment. When performing this measurement, parameters, such as the intake air amount, which are considered to have an influence on the engine torque but exclude the aforementioned engine rotational speed Ne and the fuel injection amount Q are maintained at constant values. Then, using the map, the basic engine torque TQb in the current operating state, that is, the basic engine torque TQb corresponding to the engine rotational speed Ne and the fuel injection amount Q is determined.

Next, in step 130, the torque sensitivity coefficient K1 of the intake air amount is calculated. The torque sensitivity coefficient K1 is the value corresponding to the amount of change in the engine torque when the intake air amount changes by a unit amount, that is, the amount of the influence of the unit amount of the intake air amount on the engine torque. When performing this calculation, reference is made to, for example, a two-dimensional map which specifies a relation between the engine rotational speed Ne and the fuel injection amount Q, and the torque sensitivity coefficient K1. This map is made in advance through experiments or the like. One example of the map is shown in FIG. 2B. In this map, as the engine rotational speed Ne becomes higher, and as the fuel injection amount Q becomes larger, the torque sensitivity coefficient K1 becomes larger. Then, using the map, the torque sensitivity coefficient K1 corresponding to the engine rotational speed Ne and the fuel injection amount Q at this time is determined.

Figure 2A:
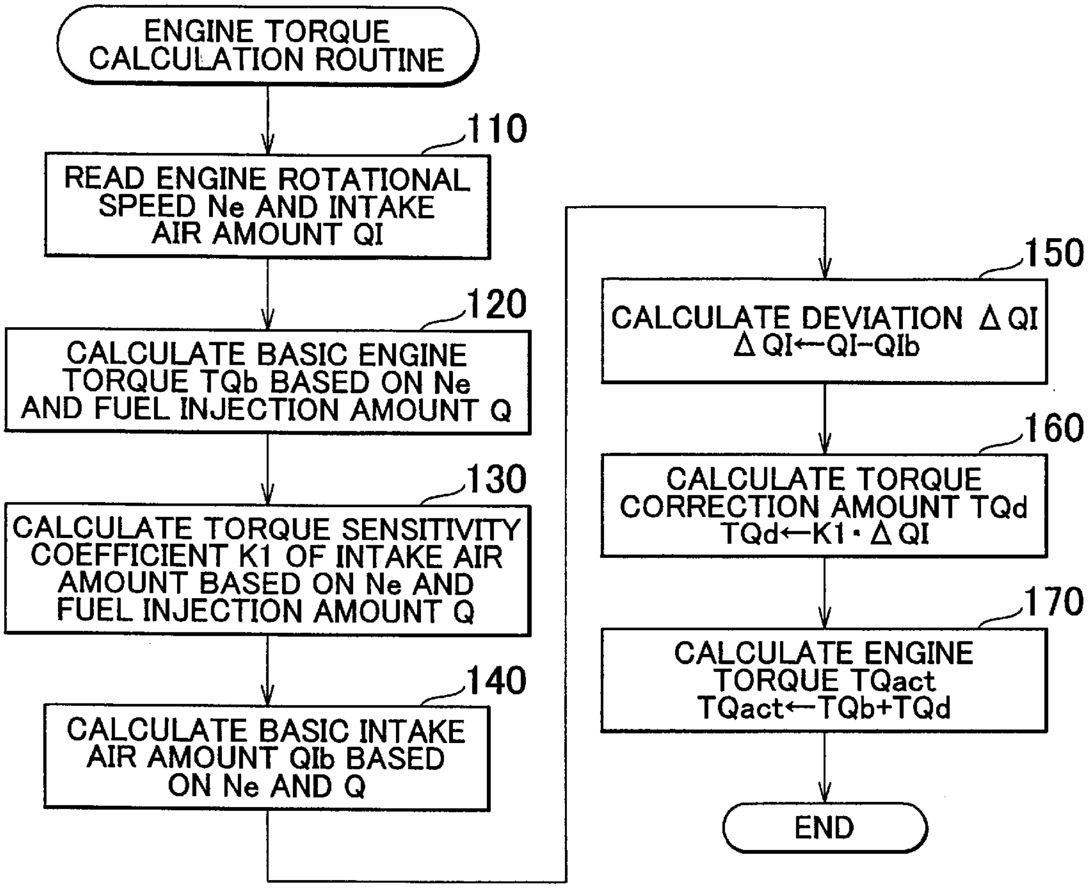
FIG. 2A is a flowchart showing a procedure for calculating engine torque in the first embodiment of the invention.
Figure 2B:
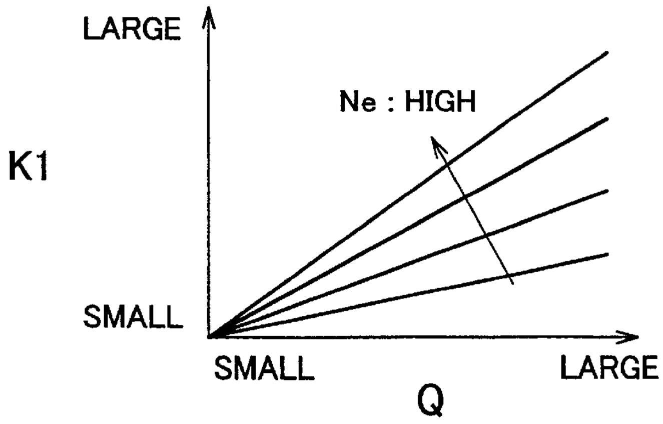
FIG. 2B is a schematic diagram showing a map structure of a map used for determining a torque sensitivity coefficient K1 in the first embodiment.

In step 140 in FIG. 2A, basic intake air amount QIb, which is the intake air amount while the engine 11 is in the standard state, is calculated. When performing this calculation, reference is made to, for example, a map which specifies a relation between the engine rotational speed Ne and the fuel injection amount Q, and the basic intake air amount QIb. The map is made, for example, by measuring the intake air amount QI while the engine rotational speed Ne and the fuel injection amount Q are variously changed by experiment, or the like. When performing this measurement, parameters, such as an ambient temperature and an atmospheric pressure, which are considered to have an influence on the intake air amount but exclude the aforementioned engine rotational speed Ne and the fuel injection amount Q are maintained at constant values. Also, characteristics of components of the engine 11 are represented by substantially medium values of tolerances associated with the characteristics. Then, the basic intake air amount QIb corresponding to the engine rotational speed Ne and the fuel injection amount Q at this time is determined using the map.

Next, in step 150, a deviation ΔQI between the intake air amount QI read in the aforementioned step 110 and the basic intake air amount QIb obtained in the aforementioned step 140 is determined. It is considered that the deviation ΔQI is generated because the parameter (the intake air amount QI) changes at the time of transition of the operating state of the engine 11, or due to a change in the surrounding environment or the like. In step 160, a torque correction amount TQd which is the. amount of the influence of the deviation ΔQI on the engine torque TQact is calculated by multiplying the torque sensitivity coefficient K1 obtained in the aforementioned step 130 by the deviation ΔQI obtained in the aforementioned step 150. In step 170, the engine torque TQact is calculated by adding the torque correction amount TQd obtained in the aforementioned step 160 to the basic engine torque TQb obtained in the aforementioned step 120. After step 170 is executed, the engine torque calculation routine ends.

According to the first embodiment that has been described in detail, following effects can be obtained. (1) When correcting the basic engine torque TQb, not only the selected parameter (in this case, the intake air amount QI) but also the torque sensitivity coefficient K1 is used. The torque sensitivity coefficient K1 is calculated based on the current operating state of the engine 11 (the engine rotational speed Ne and the fuel injection amount Q). That is, the torque sensitivity coefficient K1 varies depending upon the operating state of the engine 11. Therefore, it is possible to determine the engine torque TQact on which the parameter has an influence whose degree depends on the current operating state of the engine 11, by correcting the basic engine torque TQb using the parameter and the torque sensitivity coefficient K1.

Accordingly, even if the degree of the influence of the parameter on the engine torque TQact changes according to the operating state of the engine (the engine rotational speed Ne and the fuel injection amount Q), it is possible to calculate the engine torque TQact which reflects the varying degree of influence. As a result, it is possible to improve the accuracy of calculating the engine torque TQact as compared with a case where the basic engine torque is corrected using a single correction coefficient that is set according to the type of the parameter.

(2) When correcting the basic engine torque TQb, the deviation ΔQI between the calculated value of the parameter in the standard state (the basic intake air amount QIb) and the detected actual value (the intake air amount Q) is determined, and the torque correction amount TQd is calculated based on the deviation ΔQI and the torque sensitivity coefficient K1 . Accordingly, in the case where the parameter changes, for example, at the time of transition of the engine operating state, even if the degree of the influence of the parameter on the engine torque TQact varies according to the operating state of the engine 11, the engine torque TQact can be calculated with high reliability and high accuracy, by correcting the basic engine torque TQb using the torque correction amount TQd.

(3) The intake air amount QI changes at the time of transition of the engine operating state, for example, at the time of acceleration or deceleration, or due to a change in the environment (the ambient temperature, the atmospheric pressure, or the like), variations among individual engines, variations in a boost pressure characteristic of the turbocharger 34, or the like. In this regard, in the first embodiment, the torque sensitivity coefficient K1 associated with the intake air amount QI as the selected parameter is used as the torque sensitivity coefficient for correcting the basic engine torque. Accordingly, even if the degree of the influence of the intake air amount QI on the engine torque TQact varies according to the operating state of the engine 11, it is possible to determine a torque increase or decrease value corresponding to the degree of the influence by using the torque sensitivity coefficient K1. In other words, it is possible to determine the amount of the influence of the change in the intake air amount QI on the engine torque TQact, as the torque correction amount TQd. As a result, even if the intake air amount QI changes at the time of transition of the engine operating state, or the like, the engine torque TQact can be calculated with high accuracy by correcting the basic engine torque TQb in the standard state with the torque increase or decrease value.

Second Embodiment

Next, a second embodiment of the invention will be described. The second embodiment is different from the first embodiment in that a torque sensitivity coefficient K2 of the boost pressure (the intake air pressure PI), instead of the intake air amount QI, is determined, and the torque correction amount TQd is calculated using this torque sensitivity coefficient K2. Hereinafter, each processing of an engine torque calculation routine will be described focusing on the aforementioned difference.

Figure 3A:
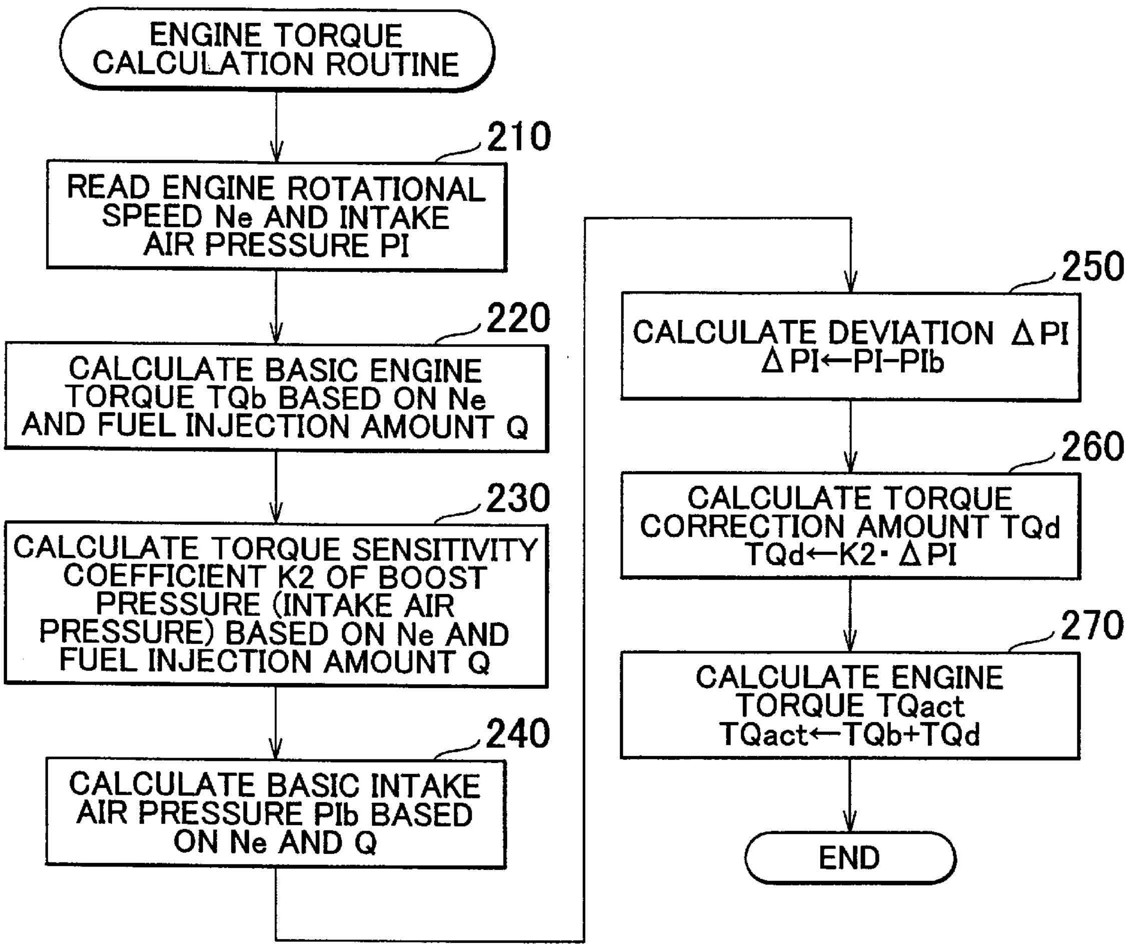
FIG. 3A is a flowchart showing a procedure for calculating engine torque in a second embodiment.

As shown in a flowchart in FIG. 3A, first, in step 210, the ECU 52 reads the engine rotational speed Ne and the intake air pressure PI. Subsequently, in step 220, the basic engine torque TQb is calculated based on the engine rotational speed Ne and the fuel injection amount Q. This processing is the same as that in step 120 in the first embodiment.

Figure 3B:
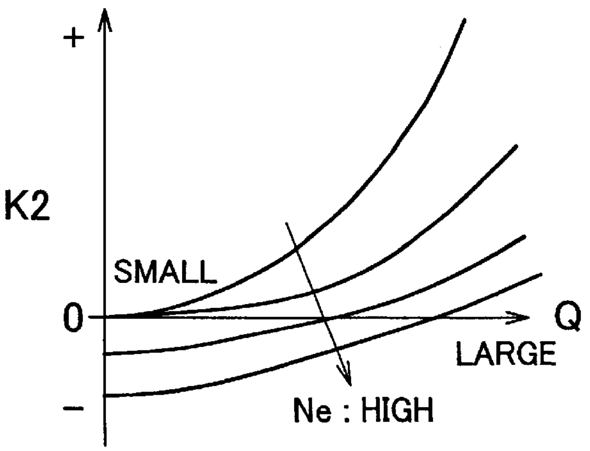
FIG. 3B is a schematic diagram showing a map structure of a map used for determining a torque sensitivity coefficient K2 in the second embodiment.

Next, in step 230, the torque sensitivity coefficient K2 of the intake air pressure PI is calculated. The torque sensitivity coefficient K2 is the value corresponding to the amount of change in the engine torque when the intake air pressure PI changes by a unit amount, that is, the amount of the influence of the unit amount of the intake air pressure PI on the engine torque. When performing this calculation, reference is made to, for example, a two-dimensional map which specifies a relation between the engine rotational speed Ne and the fuel injection amount Q, and the torque sensitivity coefficient K2. The map is made in advance through experiments, or the like. One example of the map is shown in FIG. 3B. In this map, as the fuel injection amount Q becomes larger with the engine rotational speed Ne maintained at a constant value, the torque sensitivity coefficient K2 becomes larger. Also, as the engine rotational speed Ne becomes higher with the fuel injection amount Q maintained at a constant value, the torque sensitivity coefficient K2 becomes smaller. The torque sensitivity coefficient K2 is set so as to be a positive value in the low engine speed region, and so as to be generally a negative value in the high engine speed region. Using the map, the torque sensitivity coefficient K2 corresponding to the engine rotational speed Ne and the fuel injection amount Q is determined.

Subsequently, in step 240 in FIG. 3A, a basic boost pressure (a basic intake air pressure PIb), which is the boost pressure while the engine 11 is in the standard state, is calculated. When performing this calculation, reference is made to, for example, a two-dimensional map which specifies a relation between the engine rotational speed Ne and the fuel injection amount Q, and the basic intake air pressure Plb. The map is made, for example, by measuring the intake air pressure PI while the engine rotational speed Ne and the fuel injection amount Q are variously changed by experiment, or the like. When performing this measurement, parameters, such as the atmospheric pressure and the boost pressure characteristic of the turbocharger 34, which are considered to have an influence on the intake air pressure PI but exclude the aforementioned engine rotational speed Ne and the fuel injection amount Q are maintained at constant values. Also, characteristics of components of the engine 11 are represented by substantially medium values of tolerances associated with the characteristics. Then, the basic intake air pressure PIb corresponding to the engine rotational speed Ne and the fuel injection amount Q at this time is determined using the map.

Next, in step 250, a deviation ΔPI between the intake air pressure PI obtained in the aforementioned step 210 and the basic air pressure PIb obtained in the aforementioned step 240 is determined. It is considered that this deviation ΔPI is generated because the parameter (the intake air pressure PI) changes at the time of transition of the engine operating state, for example, at the time of acceleration or deceleration, or due to a change in the surrounding environment (the ambient temperature, the atmospheric pressure, or the like), variations in the boost pressure characteristic of the turbocharger 34, or the like, as described later.

Next, in step 260, by multiplying the torque sensitivity coefficient K2 obtained in the aforementioned step 230 by the deviation API obtained in the aforementioned step 250, the torque correction amount TQd, which is the amount of the influence of the deviation API on the engine torque TQact, is calculated. In step 270, the engine torque TQact is calculated by adding the torque correction amount TQd obtained in the aforementioned step 260 to the basic engine torque TQb obtained in the aforementioned step 220. After step 270 is executed, the engine torque calculation routine ends.

Since the torque sensitivity coefficient K2 is a positive value in the low engine speed region according to the map in FIG. 3B, the engine torque TQact is larger than the basic engine torque TQb. However, the torque sensitivity coefficient K2 may be a negative value in the high engine speed region. In this case, the engine torque TQact is smaller than the basic engine torque TQb.

According to the second embodiment that has been described in detail, the same effects as the aforementioned effects in (1) and (2) can be, obtained. In addition, the following effect can be obtained. (4) As a method of calculating the engine torque TQact, it has been proposed (as in Japanese Laid-Open Patent Publication No. 2000-127807) to calculate the basic engine torque TQb based on the engine rotational speed Ne and the fuel injection amount Q and correct the calculated basic engine torque TQb by using the intake air pressure PI. However, the intake air pressure PI changes at the time of transition of the engine operating state, for example, at the time of acceleration or deceleration, or due to a change in the environment (the ambient temperature, the atmospheric pressure, or the like), variations in the boost pressure characteristic of the supercharger 34, or the like.

In this regard, in the second embodiment, the torque sensitivity coefficient K2 associated with the boost pressure (the intake air pressure PI) as the selected parameter is used as the torque sensitivity coefficient for correcting the basic engine torque. Accordingly, even if the degree of the influence of the intake air pressure PI on the engine torque TQact varies according to the operating state of the engine 11, it is possible to determine a torque increase or decrease value corresponding to the degree of the influence. In other words, it is possible to determine the amount of the influence of the intake air pressure PI on the engine torque TQact, as the torque correction amount TQd. As a result, even if the intake air pressure PI changes at the time of transition of the engine operating state, or the like, the engine torque TQact can be calculated with high accuracy by correcting the basic engine torque TQb in the standard state by the torque increase or decrease value.

Third Embodiment

Next, a third embodiment of the invention will be described. The third embodiment is different from the first embodiment in that a torque sensitivity coefficient of an injection pressure, instead of the intake air amount QI, is determined, and the torque correction amount TQd is calculated using this torque sensitivity coefficient. Hereinafter, processing of an engine torque calculation routine that is performed by the ECU 52 will be described focusing on the aforementioned difference. Since the engine 11 is configured such that the high-pressure fuel in the common rail 27 is injected by opening the fuel injector 26, there is a close relation between the injection pressure and the pressure of the fuel in the common rail 27 (the fuel pressure PF). Therefore, in the engine torque calculation routine, a torque sensitivity coefficient K3 of the fuel pressure PF is used as the value equivalent to the torque sensitivity coefficient of the injection pressure.

Figure 4A:
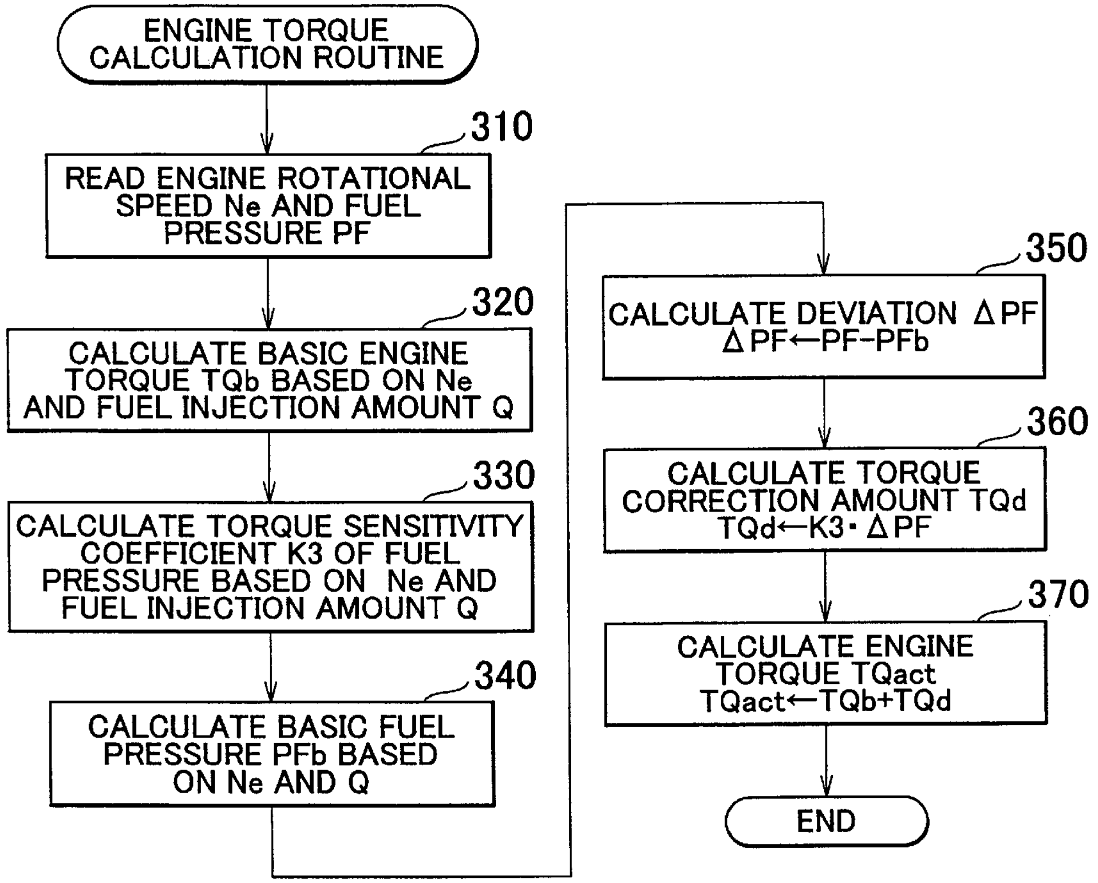
FIG. 4A is a flowchart showing a procedure for calculating engine torque in a third embodiment.

As shown in a flowchart in FIG. 4A, first, in step 310, the ECU52 reads the engine rotational speed Ne and the fuel pressure PF. Subsequently, in step 320, the basic engine torque TQb is calculated based on the engine rotational speed Ne and the fuel pressure PF. This processing is the same as the processing in step 120 in the first embodiment.

Figure 4B:
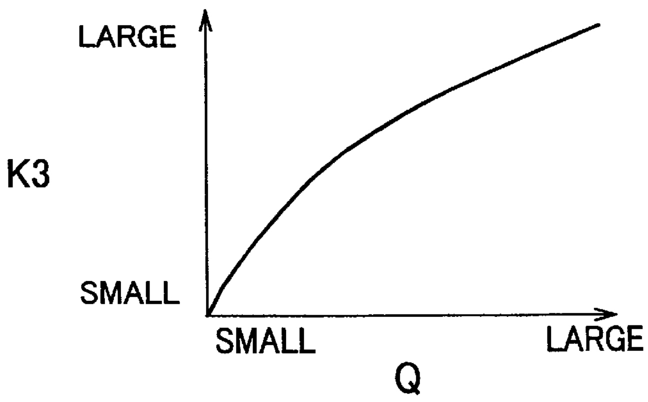
FIG. 4B is a schematic diagram showing a map structure of a map used for determining a torque sensitivity coefficient K3 in the third embodiment.

Next, in step 330, the torque sensitivity coefficient K3 of the fuel pressure PF is calculated. The torque sensitivity coefficient K3 is the value corresponding to the amount of change in the engine torque when the fuel presssure PF changes by a unit amount, that is, the amount of the influence of the unit amount of the fuel pressure PF on the engine torque. When performing this calculation, reference is made to, for example, a two-dimensional map which specifies a relation between the engine rotational speed Ne and the fuel injection amount Q, and the torque sensitivity coefficient K3. This map is made in advance through experiments, or the like. One example of the map is shown in FIG. 4B. In this map, as the fuel injection amount Q becomes larger, the torque sensitivity coefficient K3 becomes larger. The torque sensitivity coefficient K3 corresponding to the engine rotational speed Ne and the fuel injection amount Q at this time is determined using the map.

Changes in the torque sensitivity coefficient K3 in response to changes in the engine rotational speed Ne are significantly smaller than those in response to changes in the fuel injection amount Q. Therefore, in the map in FIG. 4B, only the torque sensitivity coefficient K3 at a representative engine rotational speed Ne is shown for the sake of convenience. Thus, the map does not mean that the torque sensitivity coefficient K3 is determined using only the fuel injection amount Q irrespective of the engine rotational speed Ne.

In step 340 in FIG. 4A, a basic fuel pressure PFb, which is the fuel pressure while the engine 11 is in the standard state, is calculated. When performing this calculation, reference is made to, a two-dimensional map which specifies a relation between the engine rotational speed Ne and the fuel injection amount Q, and the basic fuel pressure PFb. The map is made, for example, by measuring the fuel pressure PF while the engine rotational speed Ne and the fuel injection amount Q are variously changed by experiment, or the like. When performing this measurement, parameters, such as the ambient temperature, the atmospheric pressure and the coolant temperature, which are considered to have an influence on the fuel pressure PF but exclude the aforementioned engine rotational speed Ne and the fuel injection amount Q are maintained at constant values. Also, characteristics of components of the engine 11 are represented by substantially medium values of tolerances of the characteristics. Then, the basic fuel pressure PFb corresponding to the engine rotational speed Ne and the fuel injection amount Q at this time is determined using the map.

Next, in step 350, a deviation ΔPF between the fuel pressure PF obtained in the aforementioned step 310 and the basic fuel pressure PFb obtained in the aforementioned step 340 is determined. In step 360, by multiplying the torque sensitivity coefficient K3 obtained in the aforementioned step 330 by the deviation ΔPF obtained in the aforementioned step 350, the torque correction amount TQd, which is the amount of the influence of the deviation ΔPF on the engine torque TQact, is calculated. In step 370, the engine torque TQact is calculated by adding the torque correction amount TQd obtained in the aforementioned step 360 to the basic engine torque TQb obtained in the aforementioned step 320. After step 370 is executed, the engine torque calculation routine ends.

According to the third embodiment that has been described in detail, the same effects as the aforementioned effects in (1) and (2) can be obtained. In addition, the following effect can be obtained. (5) As a method of calculating the engine torque, it has been proposed (as in Japanese Laid-Open Patent Publication No. 2000-127807) to calculate the basic engine torque TQb based on the engine rotational speed Ne and the fuel injection amount Q and correct the calculated basic engine torque TQb by the injection pressure (the fuel pressure PF). However, the injection pressure (the fuel pressure PF) may be corrected according to changes in the environment (e.g., the ambient temperature, the atmospheric pressure and the coolant temperature) in the aforementioned injection pressure control. Also, the injection pressure may change due to a response delay (i.e., a delay in controlling the actual value to be equal to the target value) at the time of transition of the engine operating state, or the like.

In this regard, in the third embodiment, the torque sensitivity coefficient K3 associated with the fuel pressure PF (the value equivalent to the injection pressure) as the selected parameter is used as the torque sensitivity coefficient for correcting the basic engine torque. Accordingly, even if the degree of the influence of the fuel pressure PF on the engine torque. TQact varies according to the operating state of the engine 11, it is possible to determine a torque increase or decrease value corresponding to the degree of the influence, by using the torque sensitivity coefficient K3. In other words, it is possible to determine the amount of the influence of the fuel pressure PF on the engine torque TQact, as the torque correction amount TQd. As a result, even if the fuel pressure PF changes due to correction at the time of injection pressure control or the like, the engine torque TQact can be calculated with high accuracy by correcting the basic engine torque TQb in the standard state by the torque increase or decrease value (the torque correction amount TQd).

Fourth Embodiment

Next, a fourth embodiment of the invention will be described. The fourth embodiment is different from the first embodiment in that a torque sensitivity coefficient associated with the opening of the EGR valve 40, instead of the intake air amount QI, is determined, and the torque correction amount TQd is calculated using this torque sensitivity coefficient. In the engine 11, in general, the combustion state changes according to the flow amount of the EGR gas, and the engine torque changes with the change in the combustion state. The flow amount of the EGR gas changes according to the opening of the EGR valve 40. Therefore, the torque sensitivity coefficient K4 associated with the opening of the EGR valve 40 is reflected in the calculation of the engine torque.

Hereinafter, processing of an engine torque calculation routine that is performed by the ECU 52 will be described, focusing on the aforementioned difference. The opening of the EGR valve 40 changes according to a controlled variable of the EGR valve 40 (hereinafter referred to as an EGR controlled variable). Therefore, in the engine torque calculation routine, the torque sensitivity coefficient K4 of the EGR controlled variable is used as the value equivalent to the torque sensitivity coefficient of the opening of the EGR valve.

Figure 5A:
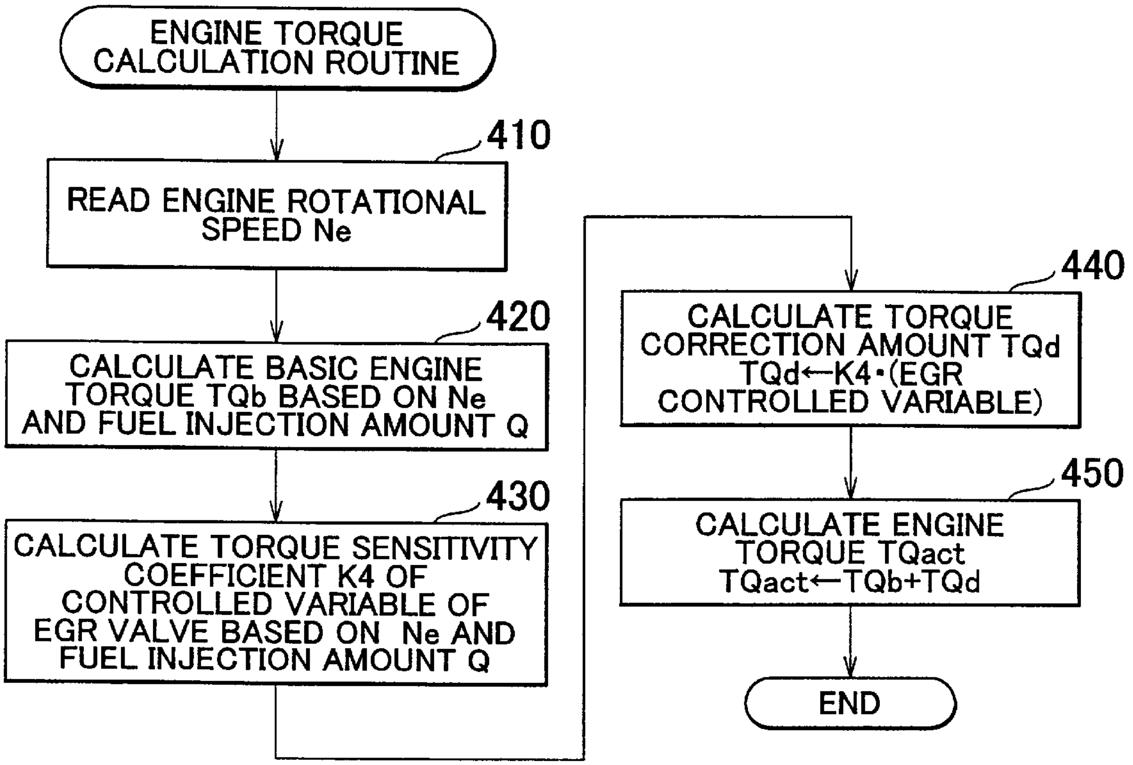
FIG. 5A is a flowchart showing a procedure for calculating engine torque in a fourth embodiment.

As shown in a flowchart in FIG. 5A, first, in step 410, the ECU 52 reads the engine rotational speed Ne. Subsequently, in step 420, the basic engine torque TQb, which is the torque while the engine 11 is in the standard state, is calculated based on the aforementioned engine rotational speed Ne and the fuel injection amount Q. This processing is the same as the processing in step 120 in the first embodiment. In the aforementioned standard state, the EGR valve 40 is in a fully closed state, and the exhaust gas recirculation (hereinafter referred to as EGR) is not performed.

Figure 5B:
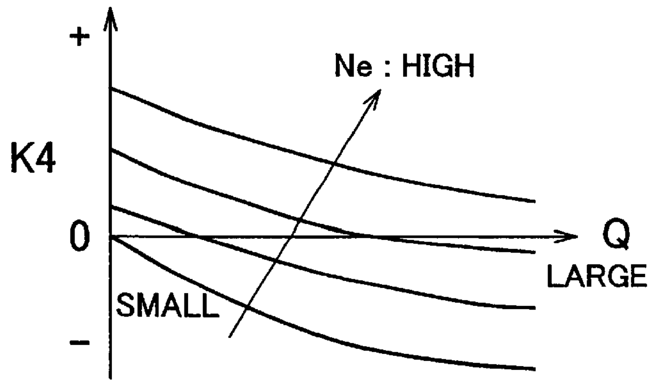
FIG. 5B is a schematic diagram showing a map structure of a map used for determining a torque sensitivity coefficient K4 in the fourth embodiment.

Next, in step 430, the torque sensitivity coefficient K4 of the EGR controlled variable is calculated. The torque sensitivity coefficient K4 is the value corresponding to the amount of change in the engine torque when the EGR controlled variable changes by a unit amount, that is, the amount of the influence of the unit amount of the EGR controlled variable on the engine torque. When performing this calculation, reference is made to, for example, a two-dimensional map which specifies a relation between the engine rotational speed Ne and the fuel injection amount Q, and the torque sensitivity coefficient K4. This map is made in advance, for example, by experiments or the like. One example of the map is shown in FIG. 5B. In this map, as the fuel injection amount Q becomes larger with the engine rotational speed Ne maintained at a constant value, the torque sensitivity coefficient K4 becomes smaller. Also, as the engine rotational speed Ne becomes higher with the fuel injection amount Q maintained at a constant value, the torque sensitivity coefficient K4 becomes larger. The torque sensitivity coefficient K4 may be a negative value in the low engine speed region. Using the map, the torque sensitivity coefficient K4 corresponding to the engine rotational speed Ne and the fuel injection amount Q at this time is determined.

In step 440 in FIG. 5A, by multiplying the EGR controlled variable at this time by the torque sensitivity coefficient K4 obtained in the aforementioned step 430, the torque correction amount TQd is calculated. In step 450, the engine torque TQact is calculated by adding the torque correction amount TQd obtained in the aforementioned step 440 to the basic engine torque TQb obtained in the aforementioned step 420. After step 450 is executed, the engine torque calculation routine ends.

Since the torque sensitivity coefficient K4 is a positive value in the high engine speed region according to the map in FIG. 5B, the engine torque. TQact is larger than the basic engine torque TQb in the high engine speed region. However, the torque sensitivity coefficient K4 may be a negative value in the low engine speed region. In this case, the engine torque TQact is smaller than the basic engine torque TQb.

According to the fourth embodiment that has been described in detail, the same effects as the aforementioned effects in (1) and (2) can be obtained. In addition, the following effect can be obtained. (6) As described above, generally, in the engine 11 in which the EGR is performed, the combustion state changes according to the flow amount of the EGR gas, and the engine torque TQact changes with the change in the combustion state.

In this regard, in the fourth embodiment, the torque sensitivity coefficient K4 associated with the EGR controlled variable (the value equivalent to the flow amount of the EGR gas) as the selected parameter is used as the torque sensitivity coefficient for correcting the basic engine torque. Accordingly, even if the degree of the influence of the flow amount of the EGR gas on the engine torque TQact varies according to the operating state of the engine 11, it is possible to determine a torque increase or decrease value corresponding to the degree of the influence, by using the torque sensitivity coefficient K4. In other words, it is possible to determine the amount of the influence of the change in the flow amount of the EGR gas on the engine torque TQact, as the torque correction amount TQd. As a result, even if the flow amount of the EGR gas changes, the engine torque TQact can be calculated with high accuracy by correcting the basic engine torque TQb in the standard state by the torque increase or decrease value (the torque correction amount TQd).

Fifth Embodiment

Next, a fifth embodiment of the invention will be described. The fifth embodiment is different from the first embodiment in that a torque sensitivity coefficient of the opening of the intake amount adjustment valve 31, instead of the intake air amount QI, is determined, and the torque correction amount TQd is calculated using this torque sensitivity coefficient. The torque sensitivity coefficient associated with the opening of the intake amount adjustment valve 31 is used for the following reason.

Part of the engine torque is consumed in order to drive the supply pump 29, and accordingly the engine torque decreases by the consumed amount. Also, as described above, the supply pump 29 is driven by the engine 11. Further, as described above, there are two modes in the method of controlling the injection pressure of the fuel, and switching between the modes is performed according to the operating state of the engine. In the mode where the amount of the fuel delivered under pressure from the supply pump 29 is adjusted by controlling the opening of the intake amount adjustment valve 31, the driving torque required for driving the supply pump 29 corresponds to the amount of the fuel delivered under pressure. The amount of loss in the engine torque due to the driving of the supply pump 29 varies according to a change in the driving torque. The amount of loss becomes smaller as the amount of the fuel delivered under pressure from the supply pump 29 becomes smaller.

Therefore, as described above, the torque sensitivity coefficient of the controlled variable of the intake amount adjustment valve 31 is reflected in the calculation of the engine torque TQact so that the aforementioned influence is reduced. Hereinafter, processing of an engine torque calculation routine that is executed by the ECU 52 will be described focusing on the aforementioned difference.

Figure 6A:
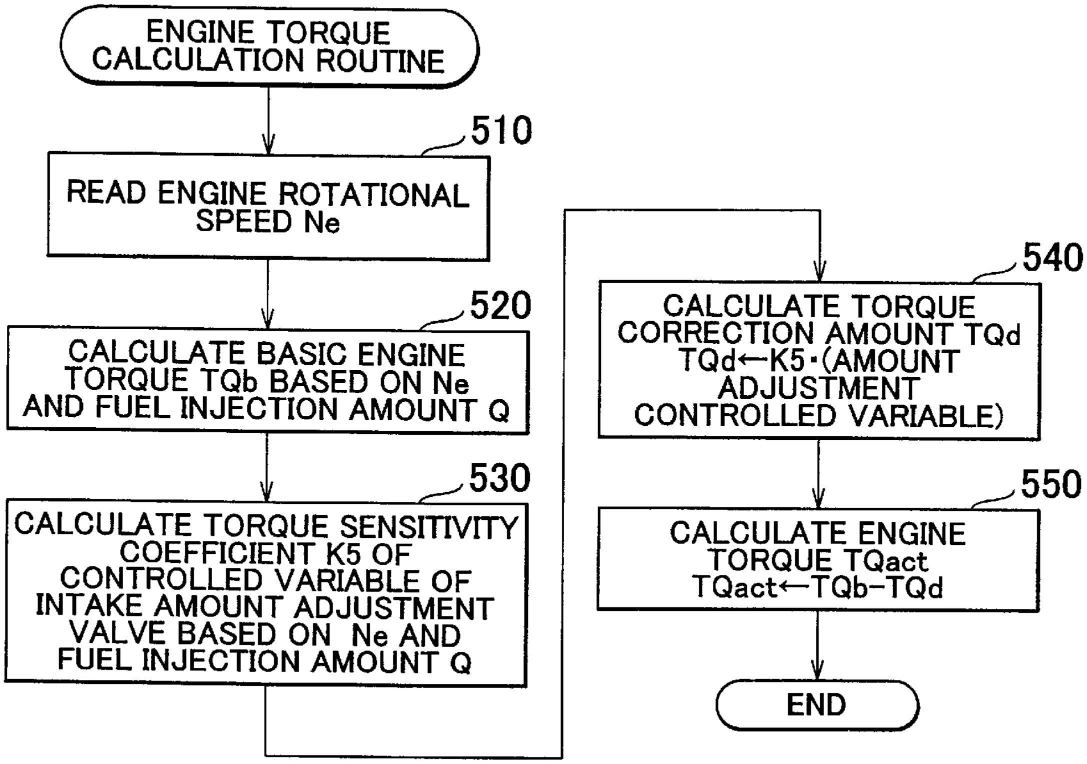
FIG. 6A is a flowchart showing a procedure for calculating engine torque in a fifth embodiment.

As shown in a flowchart in FIG. 6A, first, in step 510, the ECU 52 reads the engine rotational speed Ne. Subsequently, in step 520, the basic engine torque TQb is calculated based on the engine rotational speed Ne and the fuel injection amount Q. This processing is the same as the processing in step 120 in the first embodiment.

Figure 6B:
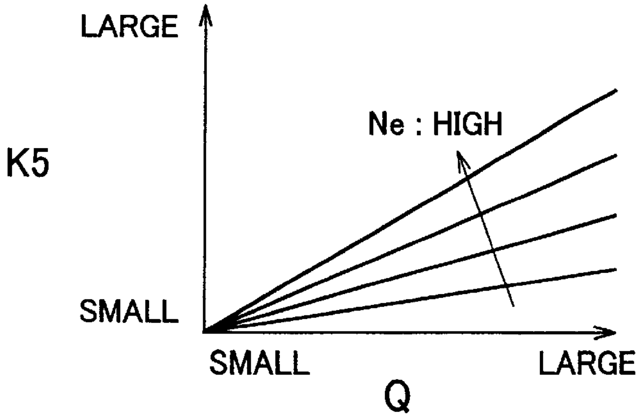
FIG. 6B is a schematic diagram showing a map structure of a map used for determining a torque sensitivity coefficient K5 in the fifth embodiment.

Next, in step 530, the torque sensitivity coefficient K5 of the controlled variable of the intake amount adjustment valve 31 is calculated. The torque sensitivity coefficient K5 is the value corresponding to the amount of change in the engine torque when the controlled variable of the intake amount adjustment valve 31 (hereinafter, referred to as an adjustment amount controlled variable) changes by a unit amount, that is, the amount of the influence of the unit amount of the adjustment amount controlled variable on the engine torque. When performing this calculation, reference is made to, for example, a two-dimensional map which specifies a relation between the engine rotational speed Ne and the fuel injection amount Q, and the torque sensitivity coefficient K5. This map is made in advance by experiment or the like. One example of the map is shown in FIG. 6B. In this map, as the engine rotational speed Ne becomes higher, and as the fuel injection amount Q becomes larger, the torque sensitivity coefficient K5 becomes larger. Using the map, the torque sensitivity coefficient K5 corresponding to the engine rotational speed Ne and the fuel injection amount Q at that time is determined.

In step 540 in FIG. 6A, by multiplying the adjustment amount controlled variable at this time by the torque sensitivity coefficient K5 obtained in the aforementioned step 530, the torque correction amount TQd is calculated. In step 550, the engine torque TQact is calculated by subtracting the torque correction amount TQd obtained in the aforementioned step 540 from the basic engine torque TQb obtained in the aforementioned step 520. After step 550 is executed, the engine torque calculation routine ends.

According to the fifth embodiment that has been described in detail, the same effect as the aforementioned effect in (1) can be obtained. In addition, the following effect can be obtained. (7) In the mode where the amount of the fuel delivered under pressure from the supply pump 29 is adjusted by the intake amount adjustment valve 31, the driving torque required for driving the supply pump 29 varies according to the amount of the delivered fuel, and the engine torque TQact varies with the varying driving torque.

In this regard, in the fifth embodiment, the torque sensitivity coefficient K5 associated with the driving torque of the supply pump 29, as the selected parameter, which changes due to adjustment performed by the intake amount adjustment valve 31 is used as the torque sensitivity coefficient for correcting the basic engine torque. Accordingly, even if the degree of the influence of the driving torque on the engine torque TQact varies according to the operating state of the engine 11, it is possible to determine a torque increase or decrease value corresponding to the operating state of the engine 11, by using the torque sensitivity coefficient K5. In other words, it is possible to determine the amount of the influence of the driving torque that changes due to the adjustment performed by the intake amount adjustment valve 31 on the engine torque TQact, as the torque correction amount TQd. As a result, even if the driving torque changes, the engine torque TQact can be calculated with high accuracy by correcting the basic engine torque TQb in the standard state by the torque increase or decrease value (the torque correction amount TQd).

Sixth Embodiment

Next, a sixth embodiment of the invention will be described. The sixth embodiment is different from the first embodiment in that a torque sensitivity coefficient of friction torque at idling time, instead of the intake air amount QI, is determined, and the torque correction amount TQd is calculated using this torque sensitivity coefficient. Generally, when the engine 11 is cold, friction of the engine 11 is larger than that in the case where the engine 11 is warmed up, due to a relatively high viscosity of a lubricant, or other reasons, and the engine torque decreases due to the large friction in the engine 11. The decrease amount varies according to the magnitude of the friction. In other words, as the warm-up proceeds, the friction of the engine 11 decreases, and accordingly the amount of loss in the engine torque decreases. Therefore, the torque sensitivity coefficient associated with the friction torque at idling time is reflected in the calculation of the engine torque.

Hereinafter, processing of an engine torque calculation routine that is executed by the ECU 52 will be described, focusing on the aforementioned difference. This routine is repeatedly executed at predetermined points of time, for example, at constant time intervals. As shown in a flowchart in FIG. 7A and FIG. 7B, first, in step 610, the ECU 52 calculates the basic engine torque TQb based on the engine rotational speed Ne and the fuel injection amount Q. This processing is the same as the processing in step 120 in the first embodiment.

Figure 8A:
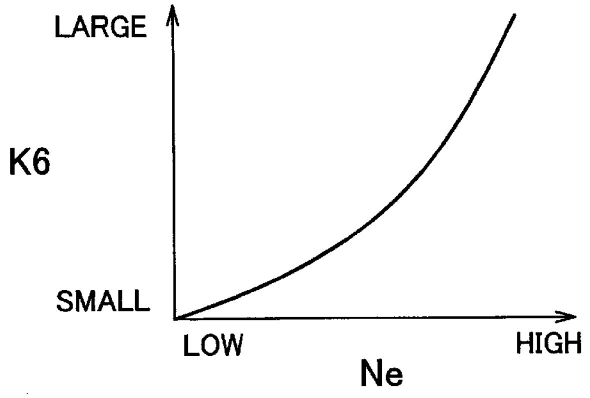
FIG. 8A is a schematic diagram showing a map structure of a map used for determining a torque sensitivity coefficient K6 in the sixth embodiment.

Next, in step 620, a torque sensitivity coefficient K6 of the firction torque at idling time is calculated. The torque sensitivity coefficient K6 is the value corresponding to the amount of change in the engine torque when the friction torque at idling time changes by a unit amount, that is, the amount of the influence of the unit amount of the idling friction torque on the engine torque. When performing this calculation, reference is made to, for example, a one-dimensional map which specifies a relation between the engine rotational speed Ne and the torque sensitivity coefficient K6. This map is made in advance through experiment, or the like. One example of the map is shown in FIG. 8A. In this map, as the engine rotational speed Ne becomes higher, the torque sensitivity coefficient K6 becomes larger. Using the map, the torque sensitivity coefficient K6 corresponding to the engine rotational speed Ne is determined.

Figure 7A:
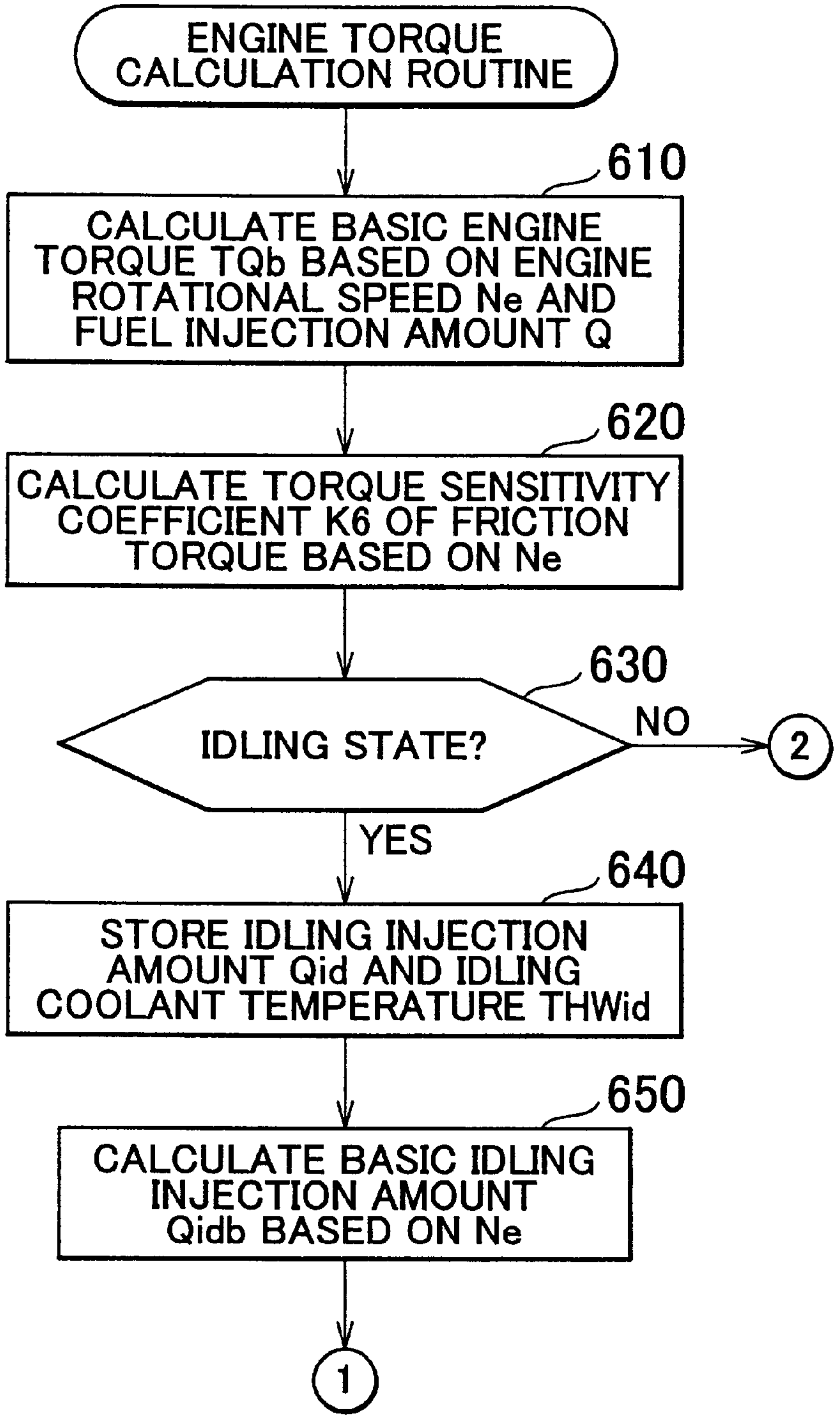
FIG. 7A is a flowchart showing a procedure for calculating engine torque in a sixth embodiment.

In step 630 in FIG. 7A, it is determined whether or not the engine 11 is in the idling state. For example, when the vehicle speed SPD detected by the vehicle speed sensor 47 is 0 km/h and the accelerator opening. ACCP detected by the accelerator sensor 45 is 0 %, it can be determined that the engine 11 is in the idling state. When this determination condition is satisfied, in step 640, the fuel injection amount Q and the coolant temperature THW at this time are stored in the memory as an idling injection amount Qid and an idling coolant temperature THWid, respectively. The idling injection amount Qid is the fuel injection amount required for controlling the engine rotational speed Ne to be close to and substantially equal to a predetermined idling rotational speed.

Subsequently, in step 650 to step 690, the friction torque at idling time (the idling friction torque TQid) is estimated. When performing this estimation, first, in step 650, a basic idling injection amount Qidb is calculated. This basic idling injection amount Qidb is the fuel injection amount when the engine 11 is in the standard idling state after warm-up. When performing this calculation, reference is made to, for example, a one-dimensional map which specifies a relation between the engine rotational speed Ne and the basic idling injection amount Qidb. Using the map, the basic idling injection amount Qidb corresponding to the current engine rotational speed Ne is determined.

Next, in step 660 in FIG. 7B, initial idling friction torque (hereinafter, simply referred to initial torque) TQids is calculated. The initial torque TQids corresponds to the amount of increase of friction relative to the friction of the engine that is in the standard state. In the case where the idling injection amount Qid of fuel is injected, the friction increases as compared with the case where the basic idling injection amount Qidb of fuel is injected. The amount of increase of torque caused by the increase in the friction is represented by the initial torque TQids. The initial torque TQids is large when the engine 11 is cold, and decreases with an increase in the temperature of the engine (the coolant temperature THW).

Figure 8B:
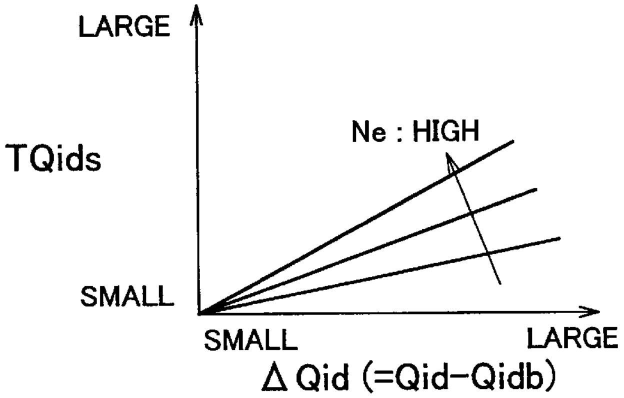
FIG. 8B is a schematic diagram showing a map structure of a map used for determining an initial idling friction torque.

When performing the calculation of the initial torque TQids, reference is made to, for example, a map which specifies a relation among a deviation ΔQid (that is, Qid–Qidb) between the idling injection amount Qid and the basic idling injection amount Qidb, the engine rotational speed Ne, and the initial torque TQids. One example of the map is shown in FIG. 8B. In this map, as the deviation ΔQid becomes larger, and as the engine rotational speed Ne becomes higher, the initial torque TQids becomes larger.

Next, in step 670 in FIG. 7B, an amount of change in the idling friction torque (hereinafter, simply referred to as a torque change amount) TQidec is set to zero. The torque change amount TQidec is the amount of reduction of the friction torque at non-idling time due to warm-up of the engine 11, more specifically, due to an increase in the temperature of the engine 11 (the coolant temperature THW), as described later.

Figure 8C:
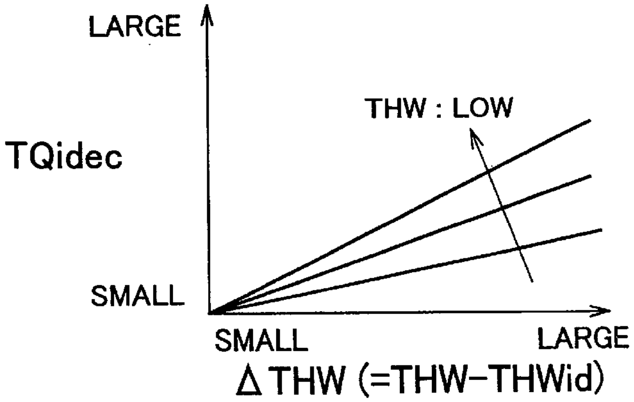
FIG. 8C is a schematic diagram showing a map structure of a map used for determining an amount of change in idling friction torque.

Meanwhile, when the determination condition is not satisfied in the aforementioned step 630, the torque change amount TQidec at non-idling time is calculated in step 680. When performing this calculation, reference is made to a two-dimensional map which specifies a relation between a deviation ΔTHW between the idling coolant temperature THWid and the coolant temperature THW at non-idling time (for example, at the time of running), the coolant temperature THW at non-idling time (for example, at the time of running) and the torque change amount TQidec. The deviation ΔTHW is the deviation between the idling coolant temperature THWid previously stored at idling time (in step 640) and the present coolant temperature THW (at non-idling time). One example of the map is shown in FIG. 8C. In this map, as the deviation ΔTHW becomes larger, and as the coolant temperature THW becomes lower, the torque change amount TQidec becomes larger. Thus, in this map, the torque change amount TQidec in relation to the increase amount of the coolant temperature THW (that is, the deviation ΔTHW) is plotted for each coolant temperature THW. Using the map, the torque change amount TQidec corresponding to the deviation ΔTHW and the coolant temperature THW is determined.

Figure 7B:
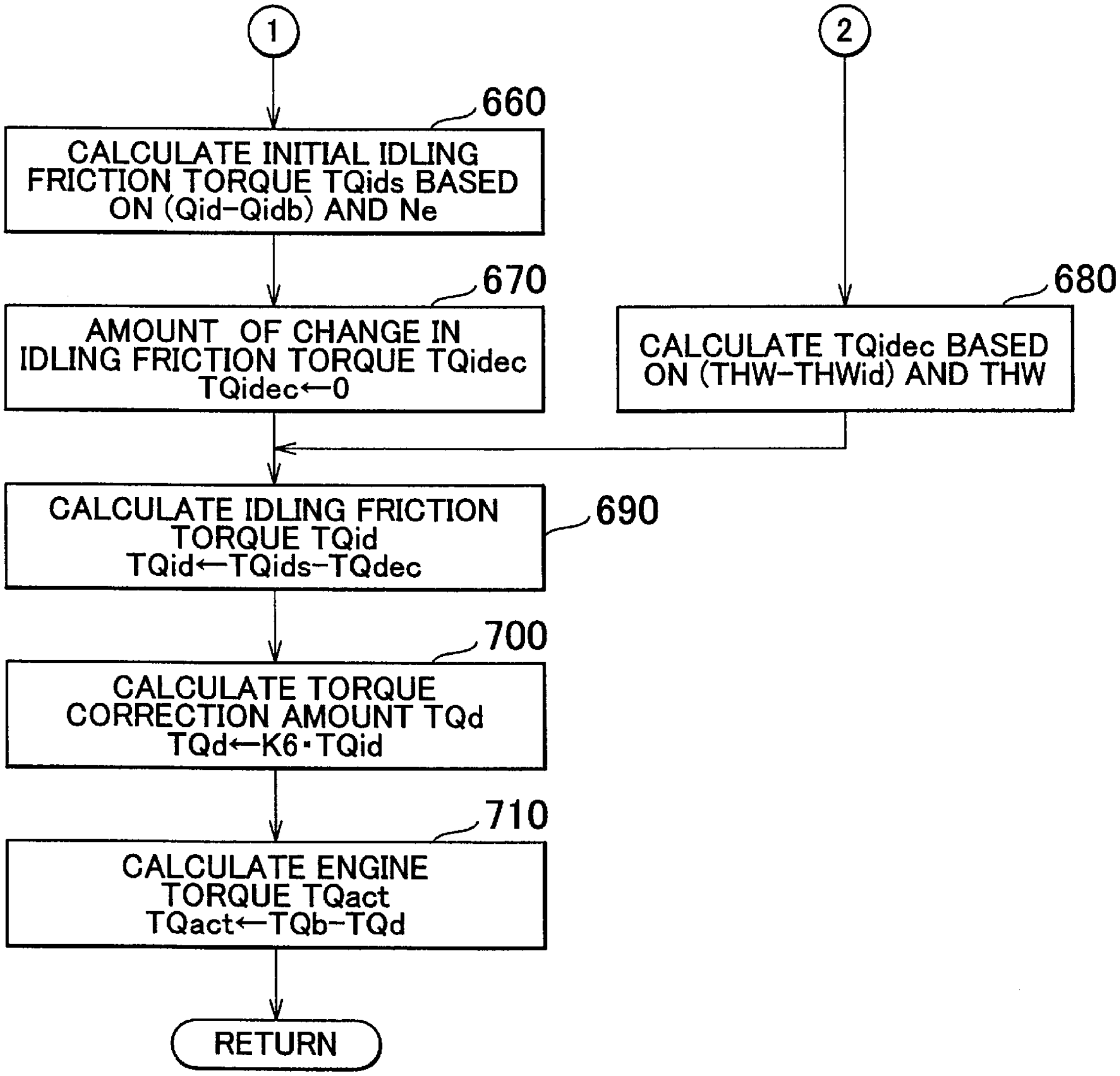
FIG. 7B is a flowchart showing the procedure for calculating engine torque in the sixth embodiment.

After the torque change amount TQidec is determined in step 670 or in step 680 in FIG. 7B as described above, the idling friction torque TQid is calculated in step 690. That is, by subtracting the torque change amount TQidec obtained in the aforementioned step 670 or step 680 from the initial torque TQids obtained in the aforementioned step 660, the idling friction torque TQid is calculated.

Next, in step 700, the torque correction amount TQd is calculated by multiplying the idling friction torque TQid in the aforementioned step 690 and the torque sensitivity coefficient K6 in the aforementioned step 620. In step 710, the engine torque TQact is calculated by subtracting the torque correction amount TQd obtained in the aforementioned stpe 700 from the basic engine torque TQb obtained in the aforementioned step 610. After step 710 is executed, the engine torque calculation routine ends.

According to the sixth embodiment that has been described in detail, the same effect as the aforementioned effect in (1) can be obtained. In addition, the following effects can be obtained. (8) When the engine 11 is cold, the friction increases due to an increase in the viscosity of a lubricant, or other reasons, as compared with when the engine 11 is warmed up. The friction changes under the influence of the temperature of the engine 11.

In this regard, in the sixth embodiment, the torque sensitivity coefficient K6 associated with the friction torque TQid at idling time as the selected parameter is used as the torque sensitivity coefficient for correcting the basic engine torque. Accordingly, even if the degree of the influence of the friction at idling time on the engine torque TQact varies according to the operating state of the engine 11, it is possible to determine a torque increase or decrease value corresponding to the degree of the influence, by using the torque sensitivity coefficient K6. In other words, it is possible to determine the amount of the influence of the friction at idling time on the engine torque, as the torque correction amount TQd. As a result, even if the friction changes according to the temperature of the engine 11, the engine torque TQact can be calculated with high accuracy by correcting the basic engine torque TQb in the standard state by the torque increase or decrease value (the torque correction amount TQd).

(9) The friction torque at idling time, that is, the torque (initial torque TQids) corresponding to the amount of increase of friction as compared with the friction of the engine that is in the standard state is calculated based on the deviation ΔQid between the basic idling injection amount Qidb in the standard state after warm-up of the engine and the idling injection amount Qid. By calculating the initial torque. TQids based on the difference from the standard state in this manner, it is possible to estimate the amount of increase of the torque due to not only the friction of the cold engine but also the friction before running-in of the engine, variations among individual engines, the viscosity of the lubricant, or the like.

(10) At idling time, the idling coolant temperature THWid is stored as the value corresponding to the temperature of the engine 11. When the engine 11 is not idling, the torque change amount TQidec, which is the amount of reduction of the friction torque with respect to the friction torque at idling time in accordance with the increase in the coolant temperature THW, is calculated based on the idling coolant temperature THWid and the deviation ΔTHW. Then, the torque change amount TQidec is subtracted from the initial torque TQids, and the result of the subtraction is used as the friction torque at non-idling time. Therefore, even at non-idling time, the idling friction torque TQid can be determined with high accuracy as well as at idling time. Also, since the idling friction torque TQid thus determined is used, the engine torque TQact can be calculated with higher accuracy.

(11) In order to calculate the basic idling injection amount Qidb, the one-dimensional map using the engine rotational speed Ne is used. Therefore, the map can be used for various idling rotational speeds. Examples of the various idling rotational speeds include an idling rotational speed when the engine is cold, which is set to be higher than that when the engine is warmed up, and an idling rotational speed which is set in response to the turn-on operation of a heater switch performed by the driver and which is set to be higher than that when the heater switch is turned off.

Seventh Embodiment

Next, a seventh embodiment of the invention will be described. The seventh embodiment is different from the first embodiment in that a torque sensitivity coefficient of a total running distance of the vehicle, instead of the intake air amount QI, is determined, and the torque correction amount TQd is calculated using this torque sensitivity coefficient. This type of torque sensitivity coefficient is used because the friction generated at a movable portion of the engine 11 (sliding resistance) has an influence on the engine torque, and the amount of the influence changes according to the operation amount of the engine 11 (the operation history of the engine (accumulated time, accumulated number of rotation, and the like) and the running history (a running distance, and the like) of the vehicle). That is, the engine friction is large when the vehicle is new. However, the engine friction decreases as the running distance of the vehicle increases. After the vehicle runs a certain distance, that is, so-called running-in is finished, the engine friction hardly changes. Then, this engine friction torque provides torque loss, which results in a change of the engine torque TQact. Hereinafter, an engine torque calculation routine that is executed by the ECU 52 will be described.

Figure 9A:
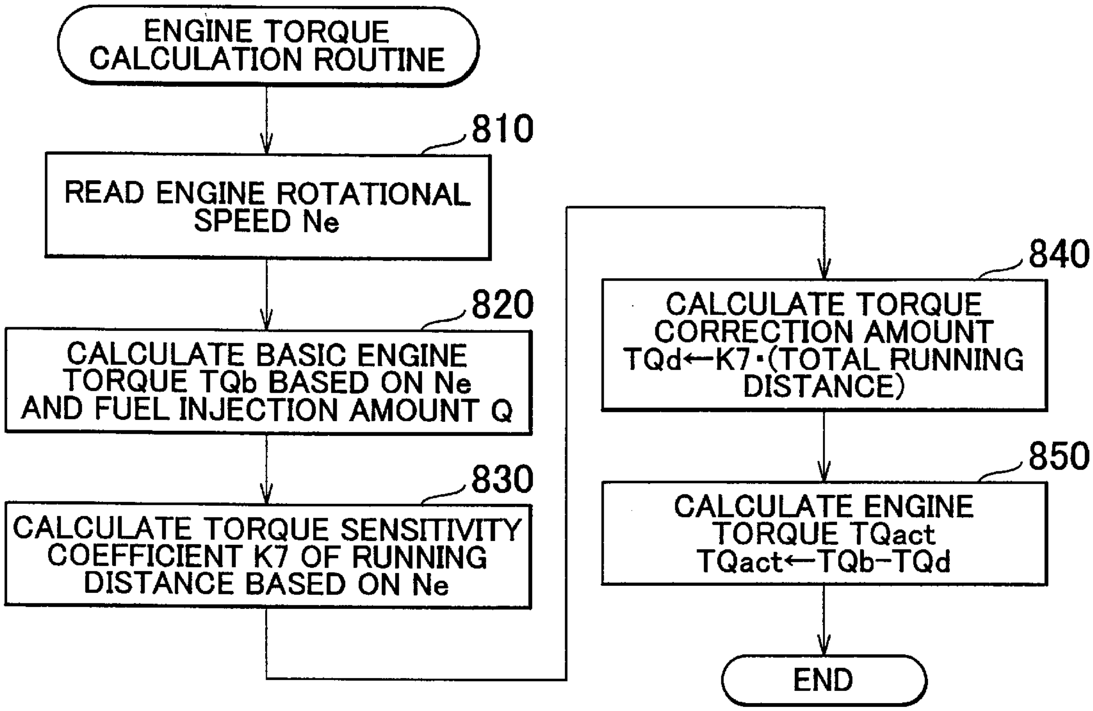
FIG. 9A is a flowchart showing a procedure for calculating engine torque in a seventh embodiment.

As shown in a flowchart in FIG. 9A, first, in step 810, the ECU 52 reads the engine rotational speed Ne detected by the crank position sensor 44. Subsequently, in step 820, the basic engine torque TQb, which is the torque while the engine 11 is in the standard state, is calculated. When performing this calculation, reference is made to, for example, a two-dimensional map which specifies a relation between the engine rotational speed Ne and the fuel injection amount Q, and the basic engine torque TQb, as in step 120 in the first embodiment. The map is made by experiment or the like. The experiment or the like is performed on the engine 11 in which the engine friction is a substantially constant value after the running-in of the vehicle is finished. Therefore, the initial friction that exists when the vehicle is new is not reflected in the basic engine torque TQb which is determined from the map. Then, using the map, the basic engine torque TQb corresponding to the engine rotational speed Ne and the fuel injection amount Q at this time is determined as the basic engine torque TQb in the operating state at this time.

Figure 9B:
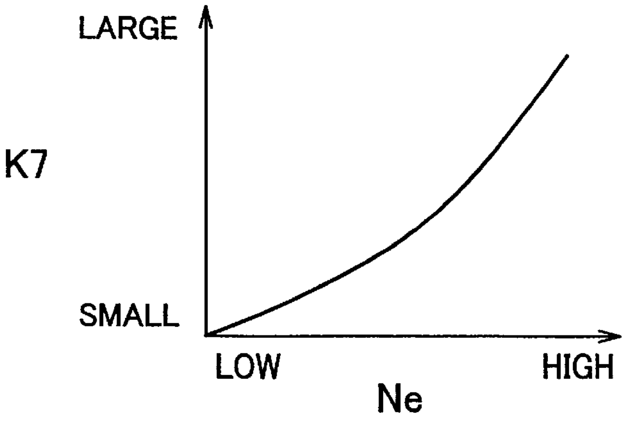
FIG. 9B is a schematic diagram showing a map structure of a map used for determining a torque sensitivity coefficient K7.

Next, in step 830, a torque sensitivity coefficient K7 of a total running distance is calculated. The torque sensitivity coefficient K7 is the value corresponding to the amount of change in the engine torque when the total running distance of the vehicle changes by a unit amount, that is, the amount of the influence of the unit amount of the total running distance on the engine torque. When performing this calculation, reference is made to, for example, a one-dimensional map which specifies a relation between the engine rotational speed Ne and the torque sensitivity coefficient K7. The map is made in advance by experiment or the like. One example of the map is shown in FIG. 9B. In this map, as the engine rotational speed Ne becomes higher, the torque sensitivity coefficient K7 becomes larger. Then, using the map, the torque sensitivity coefficient K7 corresponding to the engine rotational speed Ne is determined.

Subsequently, in step 840 in FIG. 9A, by multiplying the current total running distance by the torque sensitivity coefficient K7 obtained in the aforementioned step 830, the torque correction amount TQd is calculated. The total running distance is determined, for example, by multiplying a vehicle speed measured with respect to each predetermined period by the predetermined period (time) to calculate a running distance, and accumulating or adding together the results of the multiplication.

Then, in step 850, by subtracting the torque correction amount TQd obtained in the aforementioned step 840 from the basic engine torque TQb obtained in the aforementioned step 820, the engine torque TQact is calculated. After step 850 is executed, the engine torque calculation routine ends.

According to the seventh embodiment that has been described in detail, the same effect as the aforementioned effect in (1) can be obtained. In addition, the. following effect can be obtained. (12) As the engine friction torque changes according to the operation amount of the engine 11, the engine torque TQact also changes. In this regard, in the seventh embodiment, the torque sensitivity coefficient K7 associated with the total running distance as the selected parameter is used as the torque sensitivity coefficient for correcting the basic engine torque. Accordingly, even if the degree of the influence of the total running distance on the engine torque TQact varies according to the operating state of the engine 11, it is possible to determine a torque increase or decrease value corresponding to the degree of the influence, by using the torque sensitivity coefficient K7. In other words, it is possible to determine the amount of the influence of the total running distance on the engine torque, as the torque correction amount TQd. As a result, even if the friction decreases with an increase in the total running distance, the engine torque TQact can be calculated with high accuracy by correcting the basic engine torque TQb when the engine is in the standard state with the torque increase or decrease value.

The invention can be otherwise embodied as described below.

Even when the parameter for correcting the basic engine torque is the boost pressure, the invention can be applied to an engine which does not have the turbocharger 34.

Two or more of the parameters in the first embodiment to the seventh embodiment may be combined. In this case, the basic engine torque TQb is corrected by plural types of the torque correction amount TQd, which makes it possible to further improve the accuracy of calculating the engine torque TQact.

In the sixth embodiment, a value which is determined by experiment or the like as the basic idling injection amount Qidb is set for each engine rotational speed Ne in the map. In order to further improve the accuracy of calculating the basic idling injection amount Qidb, the idling injection amount Qid may be learned after warming-up, the difference between this learned idling injection amount Qid and a value set in the map (a map value) may be stored as a learned value, and the map value may be corrected by the learned value before being used.

In the seventh embodiment, as the operation amount of the engine 11, a total number of rotation (an accumulated value of the number of rotation) of the engine 11 may be used. In this case, a torque sensitivity coefficient associated with the total number of rotation of the crank shaft 17 as the selected parameter is used as the torque sensitivity coefficient for correcting the basic engine torque. The torque sensitivity coefficient is the value corresponding to the amount of change in the engine torque TQact when the total number of rotation changes by a unit amount. As the engine rotational speed becomes higher, the torque sensitivity coefficient becomes larger similar to the torque sensitivity coefficient K7. Accordingly, even if the degree of the influence of the total number of rotation of the crank shaft 17 on the engine torque TQact varies according to the operating state of the engine 11, it is possible to determine a torque increase or decrease value corresponding to the degree of the influence, by using the torque sensitivity coefficient. In other words, it is possible to determine the amount of the influence of the total number of rotation on the engine torque. As a result, even if the friction decreases according to an increase in the total number of rotation, the engine torque TQact can be calculated with high accuracy by correcting the basic engine torque TQb when the engine is in the standard state by the torque increase or decrease value.

The method of calculating engine torque according to the invention can be applied not only to a diesel engine but also to a gasoline engine.

What is claimed is:

1. A method of calculating engine torque, comprising of:
- calculating basic engine torque based on an engine rotational speed and a fuel injection amount;
- correcting the basic engine torque using a predetermined parameter which has an influence on the engine torque;
- calculating a torque sensitivity coefficient corresponding to an amount of change in the engine torque when the parameter changes by a unit amount based on at least the engine rotational speed; and
- correcting the basic engine torque using the calculated torque sensitivity coefficient.

2. The method according to claim 1, wherein when the basic engine torque is corrected using the parameter and the torque sensitivity coefficient, a value of the parameter in a standard state is calculated based on the engine rotational speed and the fuel injection amount, an actual value of the parameter is detected, a torque correction amount is calculated based on a deviation between the calculated value and the detected value, and the torque sensitivity coefficient, and the basic engine torque is corrected using the torque correction amount.

3. The method according to claim 1, wherein the parameter is an intake air amount.

4. The method according to claim 3, wherein as the engine rotational speed becomes higher and as the fuel injection amount becomes larger, the torque sensitivity coefficient becomes larger.

5. The method according to claim 1, wherein the parameter is an intake air pressure including a boost pressure.

6. The method according to claim 5, wherein as the engine rotational speed becomes lower and as the fuel injection amount becomes larger, the torque sensitivity coefficient becomes larger.

7. The method according to claim 1, wherein the fuel is injected by opening a fuel injection valve after being pressurized by a fuel pump and temporarily stored in a pressure accumulating container, and that the parameter is an injection pressure of the fuel injected from the fuel injection valve.

8. The method according to claim 7, wherein as the fuel injection amount becomes larger, the torque sensitivity coefficient becomes larger.

9. The method according to claim 1, wherein the parameter is a flow amount of EGR gas which is generated due to combustion of an air-fuel mixture and is recirculated into an intake passage.

10. The method according to claim 9, wherein as the engine rotational speed becomes higher and as the fuel injection amount becomes smaller, the torque sensitivity coefficient becomes larger.

11. The method according to claim 1, wherein the engine includes a fuel pump which is driven by the engine, a pressure accumulating container which temporarily stores fuel delivered under pressure from the fuel pump before the fuel is injected from a fuel injection valve, and an amount adjustment valve which adjusts an amount of the fuel delivered under pressure from the fuel pump to the pressure accumulating container, and that the parameter is driving torque of the fuel pump, which changes due to adjustment of the amount of the fuel delivered under pressure that is performed by the amount adjustment valve.

12. The method according to claim 11 wherein as the engine rotational speed becomes higher and as the fuel injection amount becomes larger, the torque sensitivity coefficient becomes larger.

13. The method according to claim 1, wherein the parameter is friction torque at idling time, which decreases according to an increase in a temperature of the engine.

14. The method according to claim 13, wherein the friction torque at idling time is calculated based on a deviation between a fuel injection amount in a standard state after warm-up and a fuel injection amount for making the engine rotational speed substantially equal to an idling rotational speed.

15. The method according to claim 14, wherein that at non-idling time, an amount of change in the friction torque corresponding to an increase in a temperature of the engine is subtracted from the friction torque at idling time, and a result of the subtraction is used as the parameter.

16. The method according to claim 13, wherein as the engine rotational speed becomes higher, the torque sensitivity coefficient becomes larger.

17. The method according to claim 1, wherein the parameter is a total running distance of a vehicle in which the engine is mounted.

18. The method according to claim 17, wherein as the engine rotational speed becomes higher, the torque sensitivity coefficient becomes larger.

19. The method according to claim 1, wherein the parameter is a total number of rotation of an output shaft of the engine.

20. The method according to claim 19, wherein as the engine rotational speed becomes higher, the torque sensitivity coefficient becomes larger.

* * * * *